United States Patent
Tanoue et al.

(10) Patent No.: US 6,216,559 B1
(45) Date of Patent: Apr. 17, 2001

(54) TRANSMISSION CASE WITH RELIEF VALVE DISPOSED THEREIN

(75) Inventors: Kimito Tanoue, Kanagawa; Masaki Nakano, Yokohama, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/414,808

(22) Filed: Oct. 8, 1999

(30) Foreign Application Priority Data

Oct. 8, 1998 (JP) .................................................. 10-286844

(51) Int. Cl.[7] .................................................. F16H 57/02
(52) U.S. Cl. .......................................... 74/606 R; 476/10
(58) Field of Search ........................... 74/606 R; 476/10, 476/42; 137/539, 454.5, 884

(56) References Cited

U.S. PATENT DOCUMENTS

| | | | |
|---|---|---|---|
| 4,297,918 | * 11/1981 | Perry | 476/10 |
| 5,230,258 | * 7/1993 | Nakano | 74/606 R |
| 5,254,056 | * 10/1993 | Nakano | 476/42 |
| 5,540,631 | * 7/1996 | Lohr, III et al. | 476/10 |
| 5,676,026 | * 10/1997 | Tsuboi et al. | 74/606 R |
| 6,110,070 | * 8/2000 | Nagai et al. | 476/42 X |

* cited by examiner

Primary Examiner—Charles A Marmor
Assistant Examiner—Ankur Parekh
(74) Attorney, Agent, or Firm—Foley & Lardner

(57) ABSTRACT

A pressure control valve for maintaining a discharge pressure of an oil pump at a predetermined value is installed in a transmission integral casing integrally constituted by a torque converter housing, an oil pump cover a transmission case of a transmission is integrally connected to the torque converter housing. The transmission case has a projecting portion that extends toward the torque converter housing and is located in the vicinity of an oil discharge port of the oil pump cover. The relief valve is installed in the projecting portion and is connected to a hydraulic passage connecting the oil discharge port and an oil supply port of a transmission control valve assembly installed at a lower portion of the transmission case.

10 Claims, 7 Drawing Sheets

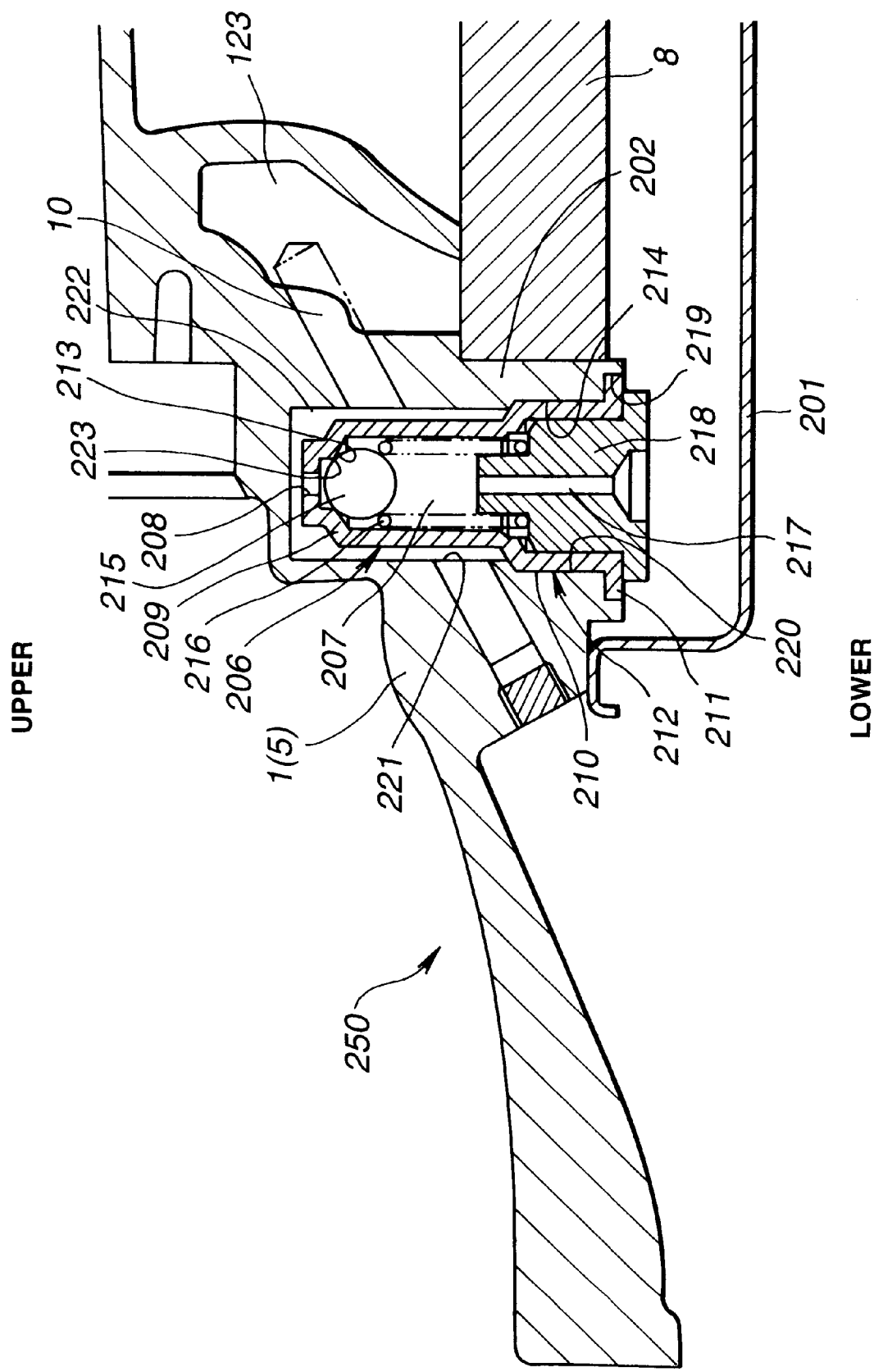

TRANSMISSION CASE WITH RELIEF VALVE DISPOSED THEREIN

BACKGROUND OF THE INVENTION

The present invention relates to an installation structure of a pressure control valve that functions to prevent hydraulic surge under low temperature by maintaining a discharge pressure of an oil pump at a predetermined value, and more particularly to an installation structure of a relief valve for a toroidal type continuously variable transmission (CVT) applied to a rear-wheel drive vehicle.

Conventional automatic transmissions for rear-wheel drive vehicles have been generally arranged to dispose a transmission control valve assembly under a transmission mechanism. Further, a relief valve for maintaining an oil discharge pressure of an oil pump is generally disposed at a lower surface of a transmission case so as to be directed toward an oil pan. In view of preferably preventing hydraulic surge under low temperature, it is preferable to employ a large size relief valve.

SUMMARY OF THE INVENTION

However, if such a large size relief valve is disposed at the lower surface of the transmission case so as to be perpendicular to a bottom surface of the oil pan, it is necessary to increase a depth of the oil pan to receive the large size relief valve therein. This results in enlarging a diametrical dimension of the transmission. Further, if the relief valve is installed at the lower surface of the transmission case to which the control valve assembly is installed, a distance between the oil discharge port and the relief valve increases. This results in degrading the performance of the relief valve.

It is an object of the present invention to provide an improved installation structure of a pressure control valve. The present invention preferably prevents the generation of oil surging under low temperature while ensuring an-excellent relief valve performance of the pressure control valve. Further, these advantages of the present invention are ensured without increasing a diametrical dimension of a transmission case to which the pressure control valve is installed.

A valve installation structure according to the present invention comprises a torque converter housing of a torque converter. A transmission case of a transmission is integrally connected to the torque converter housing. The transmission case has an oil supply port for a control valve assembly of the transmission and a projecting portion extending toward the torque converter housing. An oil pump cover of an oil pump integrally installed between the torque converter housing and the transmission case. The oil pump cover has an oil discharge port from which oil is supplied to the oil supply port of the control valve assembly. The projecting portion of the transmission case is located in the vicinity of the oil discharge port. A hydraulic passage connects the oil discharge port and the oil supply port. A pressure control valve is connected to the hydraulic passage. The pressure control valve is disposed in the projecting portion of the transmission case.

BRIEF DESCRIPTION OF THE DRAWINGS

In the drawings, like reference numerals denote like elements and components throughout all figures, in which:

FIG. 7 is a cross-sectional view showing an installation structure of a third embodiment according to the present invention.

DETAILED DESCRIPTION OF THE INVENTION

Referring to FIGS. 1 to 4, there is shown a first embodiment of an installation structure of a pressure control valve according to the present invention.

Figure 1:
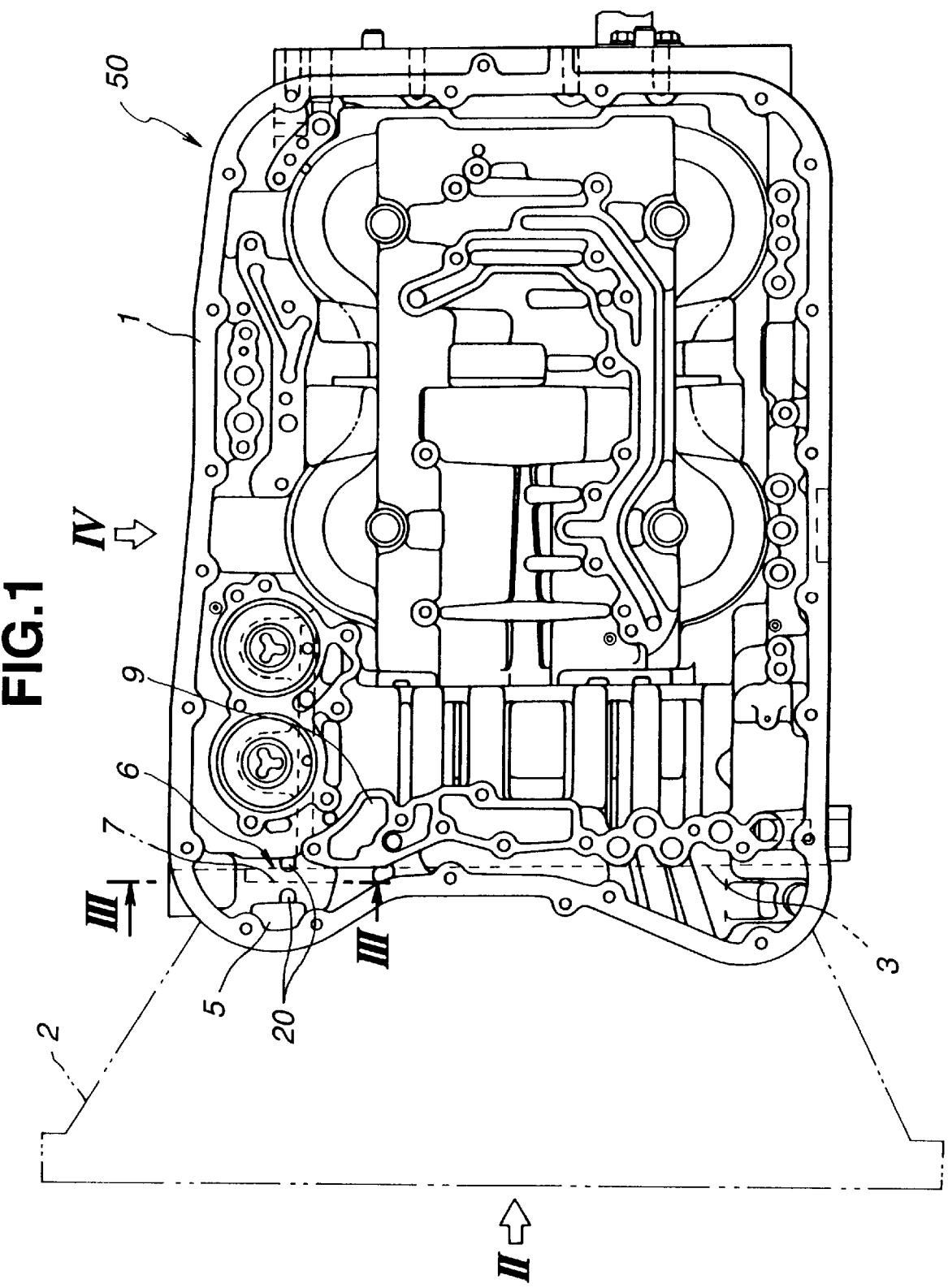
FIG. 1 is a plan view showing an integral casing of a transmission case, a torque converter housing and an oil pump cover, which view is employed to explain an installation structure of a relief valve of a first embodiment according to the present invention.

FIG. 1 shows a bottom view of a transmission case 1 of a toroidal type continuously variable transmission (toroidal type CVT) for a front-steer rear-drive vehicle. A torque converter housing 2 is integrally connected to a front end of the transmission case 1. An oil pump cover 3 is integrally formed between the transmission case 1 and the torque converter housing 2. The oil pump cover 3 has an oil discharge port 4 through which oil is supplied to a control valve assembly 8 of a transmission mechanism installed in the transmission case 1.

Figure 2:
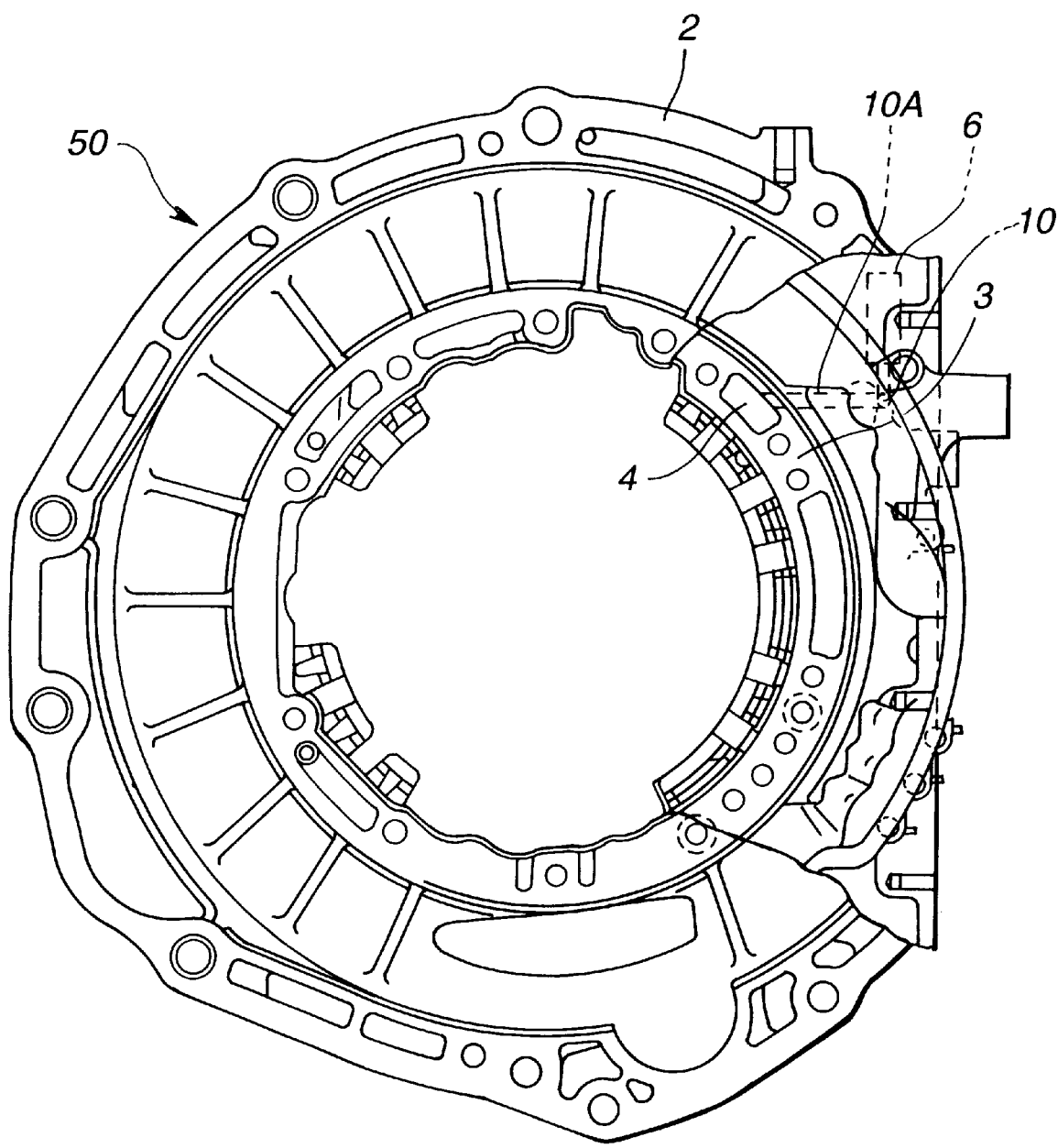
FIG. 2 is a view in the direction of the arrow II in FIG. 1.
Figure 4:
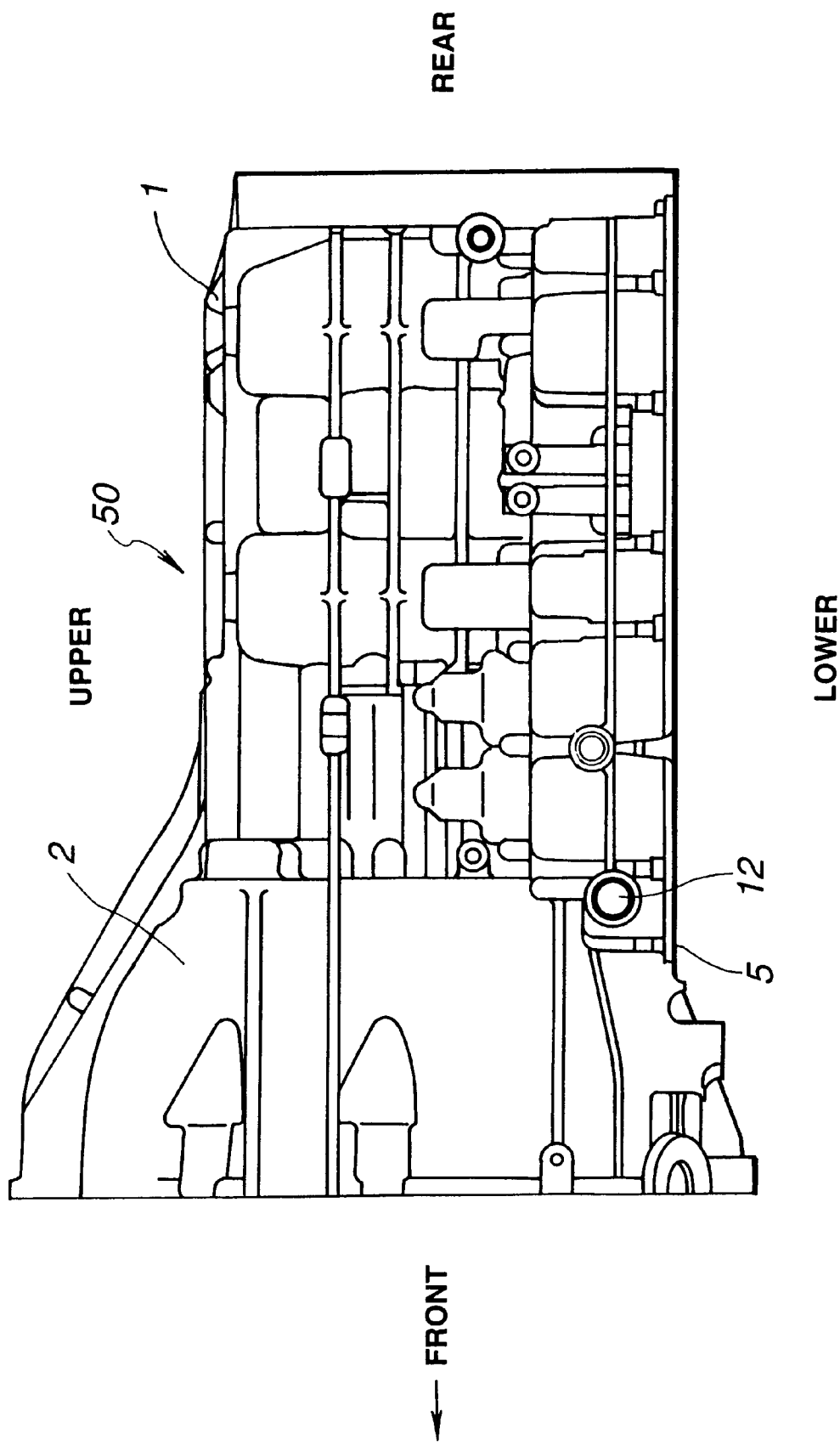
FIG. 4 is a view as viewed from a direction of an arrow IV of FIG. 1.

As is clear from FIGS. 1, 2 and 4, the transmission case 1, the oil pump cover 3 and the torque converter housing 2 are integrally connected in order of mention to form an integral casing 50. A projecting portion 5 near the oil discharge port 4 of the transmission case 1 projects toward the torque converter housing 2. More specifically, the transmission case 1 has the projecting portion 5 that is a part of the lower portion of the transmission case 1 connected to an oil pan 11. As shown in FIGS. 1 and 4, the projecting portion 5 of the transmission case 1 extends under the torque converter housing 2.

A relief valve (pressure control valve) 6 for varying a pressure of the oil discharged from the oil discharge port 4 at a predetermined pressure is installed in the projecting portion 5 of the transmission case 1. A relief valve passage 7 of the relief valve 6 is connected to an oil passage 10 branched from a hydraulic passage 10A. The hydraulic passage 10A is arranged to connect the oil discharge port 4 and an oil supply port 9 of the control valve assembly 8 disposed under the transmission mechanism (not shown). The control valve assembly 8 includes a hydraulic circuit for hydraulically controlling the transmission mechanism.

Figure 3:
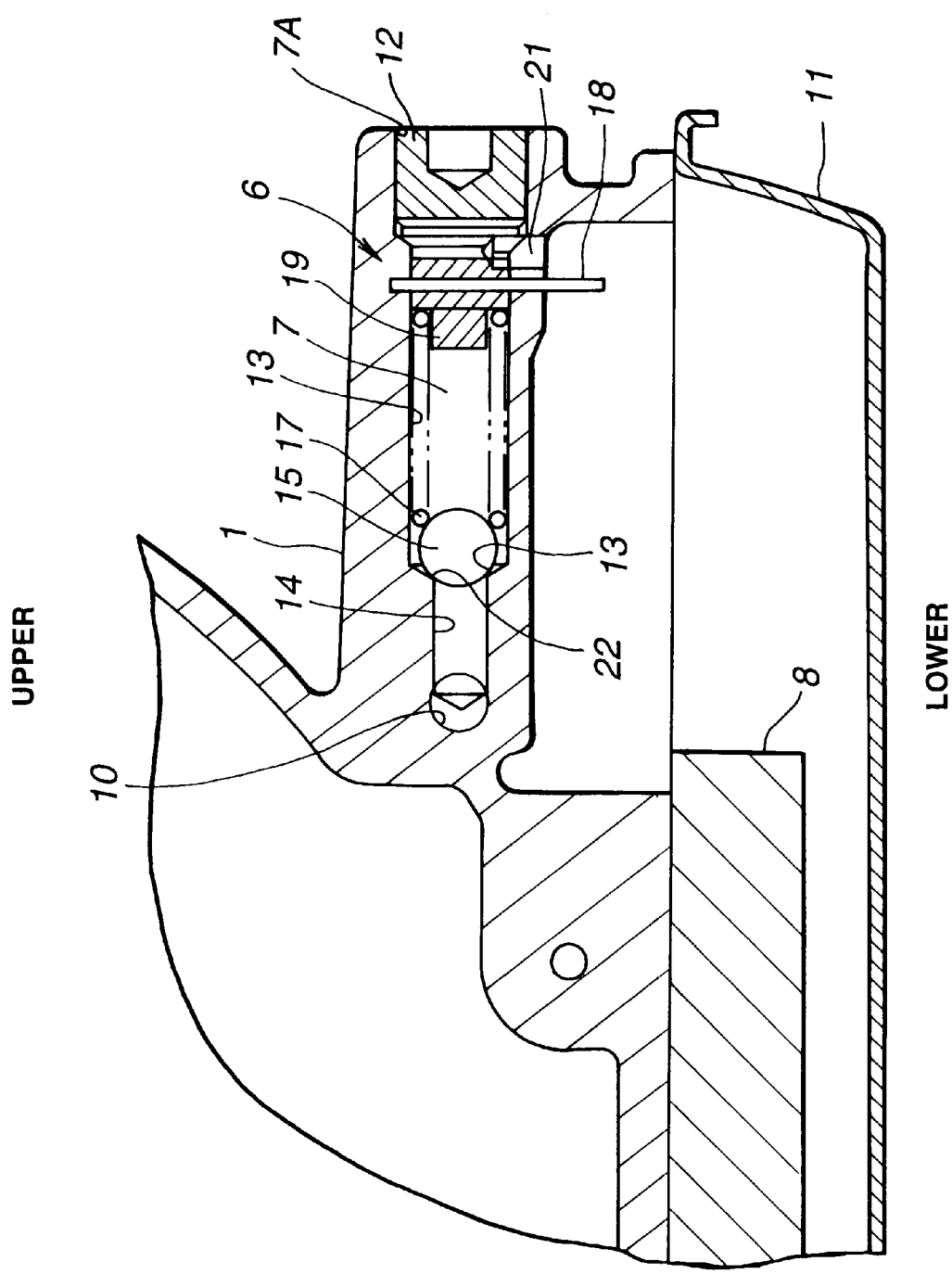
FIG. 3 is a cross-sectional view taken in the direction of the arrows substantially along the line III—III of FIG. 1.

The relief valve passage 7 is arranged such that its aligned direction is generally the same as a direction of a width of the transmission case 1 and is generally parallel with a horizontal connecting surface of the oil pan 11 disposed under the control valve assembly 8. The horizontal connecting surface (no numeral) of the oil pan 11 is sealingly connected to a lower peripheral surface (no numeral) of the transmission case 1. The direction of the width of the transmission case 1 is perpendicular to an aligned direction of the torque converter housing 2, the oil pump cover 3 and the transmission case 1. In other words, the width direction is perpendicular to a front-and-rear direction in FIG. 4. An opening end 7A of the relief valve passage 7 is generally positioned at an outer portion of a side wall of the transmission case 1 near the oil discharge port 4, as shown in FIG. 4. The opening end 7A of the relief valve passage 7 is closed by a taper screw member 12. When the integral casing 50 is installed in the vehicle, the integral casing 50 is directionally positioned as shown FIG. 4. The oil pan 11 extends to a portion below the projecting portion 5 of the transmission case 1 so as to receive oil drained from the relief valve 7. The relief valve passage 7 has a large hole 13 and a small hole 14 which are formed from the opening end 7A closed by the taper screw member 12 in order of mention, as shown in FIG. 3. The small hole 14 is connected to the oil passage 10. A valve seat 16 is formed at a connecting portion of the large hole 13 and the small hole 14.

A check ball 15 functioning as a valve element is disposed in the large hole 13 so as to be movable in an axial direction of the large hole 13. A coil spring 17 is disposed in the large hole 13, and an end of the coil spring pushes the check ball 15. That is, the coil spring 15 biases the check ball 15 to the valve seat 16. A plug 19 is disposed between the coil spring 17 and the taper screw member 12 in the larger hole 13 while being fixed to the transmission case 1 by means of a pin 18. The other end of the coil spring 17 is supported by the plug 19.

A wall portion defining the large hole 13 between the plug 19 and the valve seat 16 has a first drain hole 20 as shown in FIG. 1. Further, a second drain hole 21 is provided at the wall portion defining the large hole 13 between the plug 19 and the taper screw member 12 as shown in FIG. 3.

When the discharge pressure of the oil discharged from the oil discharge port 4 excessively increases, a hydraulic pressure of the oil in the oil passage 10 pushes the check ball 15 against the biasing force of the coil spring 17 so as to release the check ball 15 from the valve seat 16 in the thus arrange relief valve 6. Accordingly, a valve portion 22 is opened to flow the amount of the oil corresponding to the degree of the excessively increased pressure to the large hole 13. The flowed oil to the large hole 13 is discharged from the first drain hole 20 to an oil pan 11. This prevents a surge under a low-temperature condition from generating.

When the discharge pressure at the discharger port 4 decreases at a predetermined value, the check ball 15 is returned to and is in contact with the valve seat 16 due to the biasing force of the coil spring 17 to close the valve port 22.

As is apparent from the above explanation, the transmission case 1, the torque converter housing 2 and the oil pump cover 3 are integrally formed so that an adjacent portion of the oil discharge portion 4 of the transmission case 1 projects toward the torque converter housing 2. Further, the relief valve 6 is disposed in the projecting portion 5 of the transmission case 1 which portion is offset from the position of the control valve assembly 8. Therefore, this arrangement enables a large-size relief valve to be installed without changing a depth dimension of the oil pan 11. As a result, hydraulic surge under low temperature is largely suppressed without increasing the size of the toroidal type CVT. Further, the projecting portion 5 functions to increase the rigidity of the integral casing 50.

Since the relief valve 6 is disposed in the vicinity of the oil discharge port 4 of the oil pump cover 3, the relief valve 6 improves its responsibility in case of the increase of the oil discharge pressure, and therefore it performs an excellent relief performance.

Furthermore, since the coil spring 17 for biasing the check ball 15 toward the valve seat 16 is restricted by the plug 19 disposed between the coil spring 17 and the taper screw member 12, a pressure at a portion between the plug 19 and the taper screw member 12 is decreased. This enables a pressure difference between the inside and the outside of the taper screw member 12 to be decreased. Further, even if the plug 19 is broken, the oil in the relief valve 5 is discharged through the second drain hole 21 formed at the wall between the plug 19 and the taper screw member 12 to the oil pan 11. This also enables a pressure difference between the inside and the outside of the taper screw member 12 to be decreased. As a result, the sealing performance of the taper screw member 12 is improved so as to certainly prevent the leakage of the oil to external.

Further, the structure for restricting the coil spring 17 by the plug 19 cancels that the biasing force of the coil spring 17 is applied to the taper screw member 12 when the taper screw member 12 is installed. Therefore, efficiency of assembling the relief valve 6 is improved, and incorrect installation of the taper screw member 12 is prevented thereby.

Additionally, since the relief valve passage 7 is provided by making a hole from external of the side wall of the transmission case 1 as shown in FIG. 4, it is possible to facilitate the machining operation to the transmission case 1.

Figure 5:
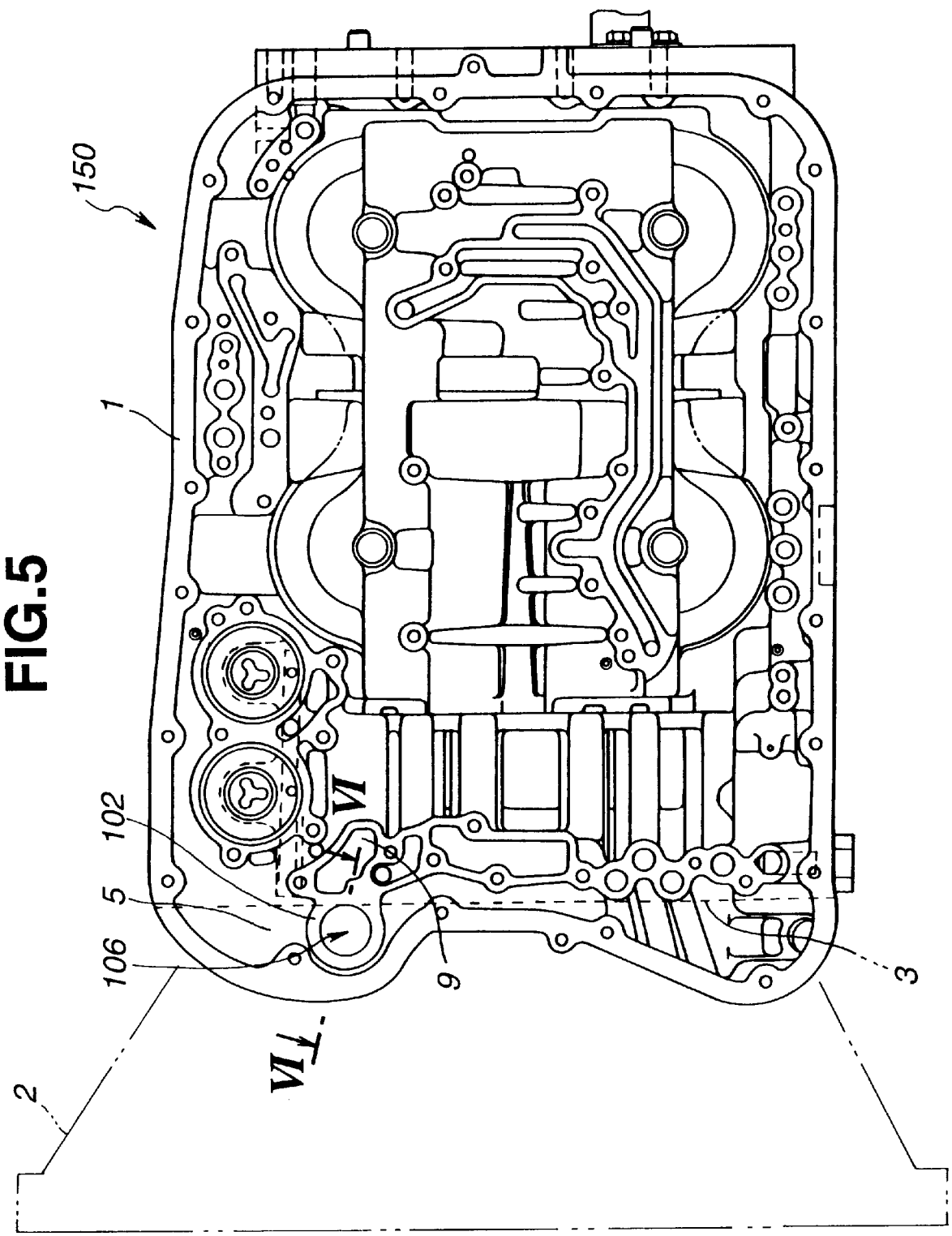
FIG. 5 is a plan view showing an integral casing to which an installation structure of a second embodiment is applied.
Figure 6:
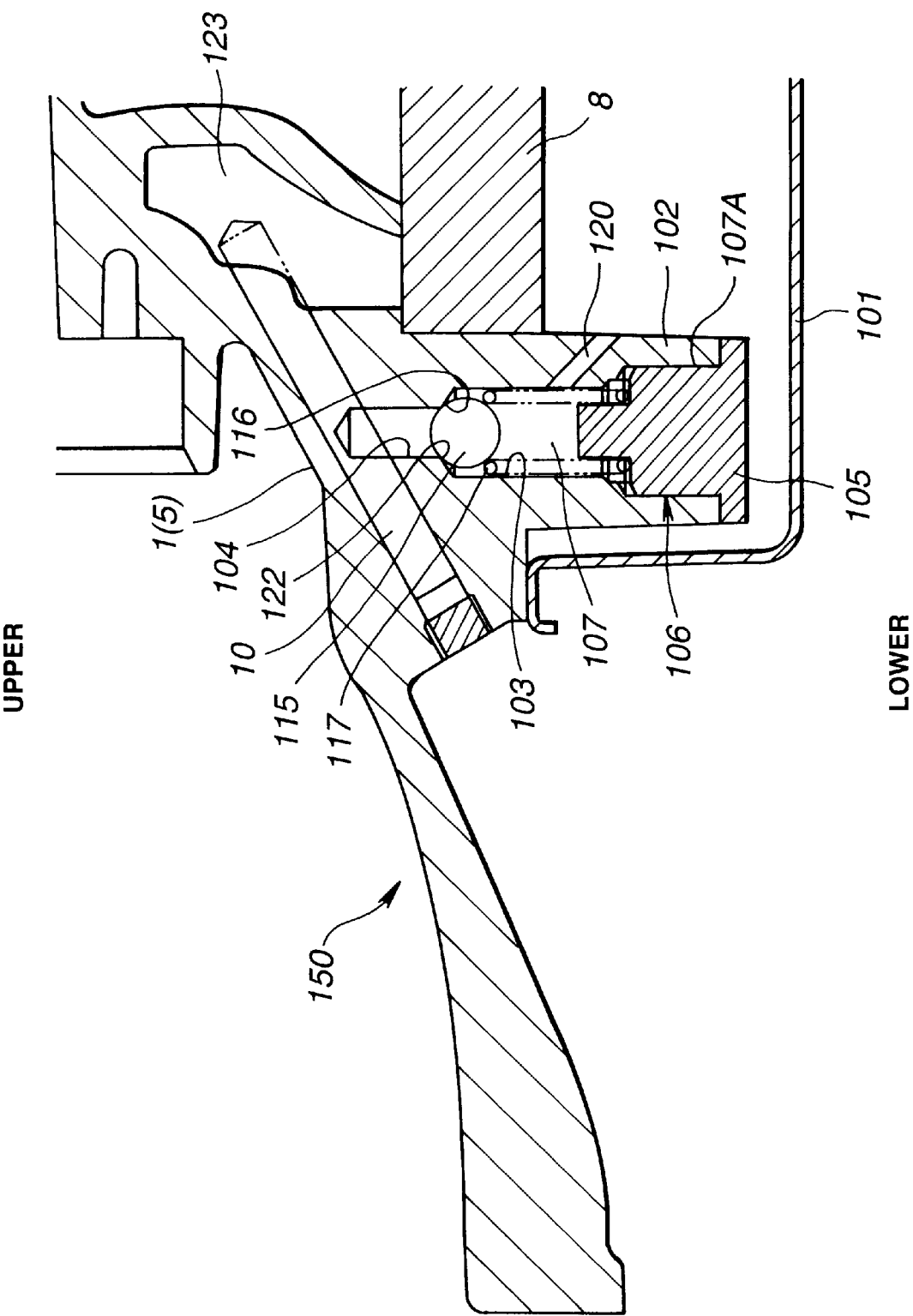
FIG. 6 is a cross-sectional view taken in the direction of arrows substantially along the line VI—VI of FIG. 5.

Referring to FIGS. 5 and 6, there is shown a second embodiment of the installation structure of a relief valve 106 according to the present invention. Parts and components as same as those of the first embodiment are denoted by same references of the first embodiment, and the explanations thereof are omitted herein.

A thick-wall portion 102 is disposed at the projecting portion 5 of the transmission case 1. The thick-wall portion 102 extends downward, that is, toward an oil pan 101 disposed under the control valve assembly 8 of the toroidal type CVT. The relief valve 106 is disposed in the thick-wall portion 102. A relief valve passage 107 of the relief valve 106 is connected to an oil passage 10 branched from a hydraulic passage 123 connecting the oil discharge port 4 and the oil supply port 9.

The relief valve passage 107 is disposed at the projecting portion 5 so as to extend from an inner side of the thick-wall portion 102 of the transmission case 1 toward the oil pan 101 as shown in FIG. 6. An opening end 107A of the relief valve passage 107 is closed by a plug 105. The oil pan 101 extends to a portion under the projecting portion 5 of the transmission case 1 so as to receive the oil drained from the relief valve 106. The relief valve passage 107 has a large hole 103 and a small hole 104 which are formed from the opening end 107A closed by the plug 105 in order of mention, as shown in FIG. 6. The small hole 104 is connected to the oil passage 10. A valve seat 116 is formed between the large hole 103 and the small hole 104.

A check ball 115 functioning as a valve element is disposed in the large hole 103 so as to be movable in an axial direction of the large hole 103. A coil spring 117 is disposed in the large hole 113, and an end of the coil spring is in contact with the check ball 115 to bias the check ball 115 to the valve seat 116. The other end of the coil spring 117 is supported by the plug 105. A drain hole 120 is formed at a wall portion defining the large hole 103.

When the discharge pressure of the oil discharged from the discharge port 4 excessively increases, a hydraulic pressure of the oil in the oil passage 10 pushes the check ball 115 against the biasing force of the coil spring 117 so as to release the check ball 115 from the valve seat 116 in the thus arranged relief valve 106. Accordingly, a valve port 122 is opened to flow the amount of the oil corresponding to the degree of the excessively increased pressure to the large hole 103. The flowed oil to the large hole 103 is discharged from the drain hole 120 to the oil pan 101. This functions to prevent a surge phenomenon under a low-temperature condition from generating.

When the discharge pressure at the oil discharger port 4 decreases at a predetermined value, the check ball 115 is returned to and is in contact with the valve seat 116 due to the biasing force of the coil spring 117 to close the valve port 122.

As is apparent from FIG. 5, the transmission case 1, the torque converter housing 2 and the oil pump cover 3 are integrally connected to form an integral casing 150. An adjacent portion of the oil discharge port 4 of the transmission case 1 projects toward the torque converter housing 2 to form the projecting portion 5. Further, the relief valve 106 is disposed at the projecting portion 5 of the transmission case 1 which portion is offset from the position of the control valve assembly 8. This arrangement enables the oil pan 101 to be small in depth dimension even if the large-size relief valve 106 is installed to the transmission case 1. As a result, hydraulic surge under low temperature is largely suppressed without increasing the size of the toroidal type CVT. Further, the projecting portion 5 functions to increase the rigidity of the integral casing 150 constituted by the transmission case 1, the oil pump housing 2, and the torque converter housing 3.

Since the relief valve 106 is disposed in the vicinity of the oil discharge port 4 of the oil pump cover 3, the relief valve 106 improves its responsibility in case of the increase of the oil discharge pressure, and therefore it performs an excellent relief performance.

Furthermore, since the relief valve passage 107 is provided by making a hole from the thick-wall portion 102 formed at the projecting portion 5 and at an inner side of the transmission case 1 of the side wall of the transmission case 1, even if the sealing performance of the plug 105 is degraded, the leakage of the oil to external is certainly prevented. Further, the number of the parts employed in the second embodiment becomes smaller than that of the first embodiment.

Referring to FIG. 7, there is shown a third embodiment of the installation structure of the relief valve according to the present invention. Parts and components as same as those of the first embodiment are denoted by same references of the first embodiment, and the explanations thereof are omitted herein.

A thick-wall portion 202 is disposed at the projecting portion 5 of the transmission case 1. The thick-wall portion 202 extends downward and toward an oil pan 201 disposed under the control valve assembly 8 of the torodial type CVT. A relief valve 206 is disposed at the thick-wall portion 202. A relief valve passage 207 of the relief valve 206 is connected to the oil passage 10 branched from the oil passage 123 connecting the oil discharge port 4 and the oil supply port 9. The oil pan 201 extends to a portion under the projecting portion 5 of the transmission case 1 so as to receive the oil discharged from the relief valve 206.

The relief valve 206 comprises a cylinder member 212, a check ball 215, a coil spring 216 and a plug 218. The cylindrical member 212 comprises a small cylindrical portion 209 whose one end portion has an oil inlet port 208, a large cylindrical portion 210 and a flange portion 211. The small cylindrical portion 209, the large cylindrical portion 210 and the flange portion 211 are axially aligned in order of mention as shown in FIG. 7. An inner surface of the small cylindrical portion 209 defines a relief valve passage 207 of the relief valve 206. The check ball 215 is disposed in the relief valve passage 207 to be movable in the axial direction of the relief valve passage 207 while being biased toward a valve seat 213 formed at the small cylindrical portion 209 by means of the coil spring 216. A plug 218 is fixed to an opening end portion of the cylindrical member 212 defined by an inner surface of the flange portion 211. The plug 218 has a drain hole 217 which axially penetrates the plug 218. An end of the plug 218 is inserted to an inner surface of the larger cylindrical portion 210 and supports the other end of the coil spring 206.

The relief valve 206, which has been previously assembled, is inserted into and engaged with an engage hole 214 formed at a thick-wall portion 202 of the projecting portion 5 of the transmission case 1. The thick-wall portion 202 is formed such that its lower surface is generally flush with a lower surface of the control valve assembly 8. The thick-wall portion 202 projects toward an upper side as shown in FIG. 7. The engage hole 214 has a bottom portion includes a large hole portion 219, an intermediate hole portion 220 and a small hole portion 221, which are formed from the lower end of the thick-wall portion 202 in order of mention as shown in FIG. 7. The large hole portion 219 and the intermediate hole portion 220 are disposed so as to correspond to the flange portion 211 and the large cylindrical portion 210 of the cylindrical member 212. The small hole portion 221 is disposed so as to correspond to the small cylindrical portion 209 of the cylindrical member 212. The small hole portion 221 is connected to the oil passage 10. The pre-assembled relief valve 206 is inserted to the engage hole 214 from the small cylindrical portion 209. The large cylindrical portion 210 and the flange portion 211 are fixed with the intermediate hole portion 220 and the large hole portion 219, respectively, by means of a press-fitting process. When the press-fitting process of the relief valve 206 to the engage hole 214 is completed, the oil inlet hole 208 formed at an end of the small hole portion 209 is located below the bottom portion of the engage hole 214 as shown in FIG. 7.

The small hole portion 221 of the engage hole 214 has a diameter which is larger than a diameter of the small cylindrical portion 209. Accordingly, a clearance 222 is formed between the small hole portion 221 and the small cylindrical portion 209. The clearance 222 functions as an oil passage, that is, so that the relief valve passage 207 is connected to the oil passage 10 through the oil inlet hole 208 and the clearance 222.

With the thus arranged relief valve 206, when the discharge pressure of the oil discharged from the discharge port 4 excessively increases, a hydraulic pressure of the oil in the oil passage 10 pushes the check ball 215 against the biasing force of the coil spring 216 so as to release the check ball 215 from the valve seat 213. Accordingly, a valve port 223 is opened to flow the amount of the oil corresponding to the degree of the excessively increased pressure into the small cylindrical portion 209. The flowed oil to the small cylindrical portion 209 is discharged from the drain hole 217 to the oil pan 201. This functions to prevent a surge phenomenon under a low-temperature condition from generating.

When the discharge pressure at the oil discharger port 4 decreases at the predetermined value, the check ball 215 is returned to and in contact with the valve seat 213 due to the biasing force of the coil spring 216 to close the valve port 223.

As is similar to the first embodiment, the third embodiment according to the present invention is arranged such that the transmission case 1, the torque converter housing 2 and the oil pump cover 3 are integrally connected to form an integral casing 250. More specifically, an adjacent portion of the oil discharge portion 4 of the transmission case 1 projects toward the torque converter housing 2. Further, the relief valve 206 is disposed at the thick-wall portion 202, which is formed at projecting portion 5 of the transmission case 1 and is offset from the position of the control valve assembly 8. The thick-wall portion 202 is provided so as to be thick toward the outer side of the transmission case 1 and toward the torque converter housing 2. Further, the thick-wall portion 202 has the lower surface generally flat with the lower surface of the control valve assembly 8. This arrangement enables the large-size relief valve 206 to be installed without changing a depth dimension of the oil pan 201. As a result, hydraulic surge under low temperature is largely suppressed without increasing the size of the toroidal type CVT. Further, the projecting portion 5 functions to increase the rigidity of the integral casing 250 of the transmission case 1, torque converter housing 2 and the oil pump cover 3.

Since the installation of the relief valve 206 of the third embodiment is completed by engaging the previously assembled relief valve 206 with the engage hole 214, it is possible to largely simplify the install operation of the relief valve 206.

Since the relief valve 206 is disposed in the vicinity of the oil discharge port 4 of the oil pump cover 3, the relief valve 206 improves its responsibility in case of the increase of the oil discharge pressure and therefore it performs an excellent relief performance.

Furthermore, since the third embodiment according to the present invention is arranged such that the relief valve 206 is fixedly engaged with the engage hole 210 which is formed at the thick-wall portion 202 formed at the projecting portion 5 and the inside surface of the transmission case 1, the leakage of the oil to external is certainly prevented.

The entire contents of Japanese Patent Application No. 10-286844 filed on Oct. 10, 1999 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A valve installation structure comprising:
   a torque converter housing of a torque converter;
   a transmission case of a transmission integrally connected to said torque converter housing, said transmission case having an oil supply port for a control valve assembly of the transmission and a projecting portion extending toward said torque converter housing;
   an oil pump cover of an oil pump integrally installed between said torque converter housing and said transmission case, said oil pump cover having an oil discharge port from which oil is supplied to the oil supply port of the control valve assembly, the projecting portion of said transmission case being located in the vicinity of the oil discharge port;
   a hydraulic passage connecting the oil discharge port and the oil supply port; and
   a pressure control valve connected to said hydraulic passage, said pressure control valve being disposed in the projecting portion of said transmission case.

2. A valve installation structure as claimed in claim 1, wherein said pressure control valve includes a relief valve which functions to vary a pressure of the oil discharged from the oil discharge port at a predetermined pressure.

3. A valve installation structure as claimed in claim 2, wherein the relief valve comprises a relief valve passage which is arranged such that an aligned direction of the relief valve passage is generally the same as a direction of a width of said transmission case and is generally parallel with a horizontal connecting surface of an oil pan disposed under the control valve assembly, an opening end of the relief valve passage being generally positioned at an outer portion of a side wall of said transmission case near the oil discharge port and closed by a taper screw member.

4. A valve installation structure as claimed in claim 3, wherein the relief valve further comprises a valve element which is disposed so as to be movable with respect to a valve seat provided in the relief valve passage, a spring which biases the valve element to the valve seat, a plug which is fixedly disposed between the spring and the taper screw member in the larger hole, a first drain hole provided between the valve seat and the plug in the relief valve passage, and a second drain hole provided between the plug and the taper screw member in the relief valve passage.

5. An installation structure as claimed in claim 2, wherein a thick-wall portion is disposed at the projecting portion of said transmission case, the thick-wall portion extending toward an oil pan disposed under the control valve assembly so as to be perpendicular to a connecting surface of the oil pan, a relief valve passage of the relief valve being formed in the thick-wall portion so as to extend along the thick-wall portion, an opening end of the relief valve passage being closed by a plug.

6. An installation structure as claimed in claim 1, wherein a thick-wall portion is disposed at the projecting portion of said transmission case, the thick-wall portion extending toward an oil pan disposed under the control valve assembly, the relief valve being installed in an engage hole formed at the thick-wall portion, the engage hole being connected to the hydraulic passage.

7. An installation structure as claimed in claim 6, wherein the relief valve comprises a cylinder member, a valve element, a spring and a plug, the cylinder member having a small cylindrical portion having an oil inlet port and a large cylindrical portion aligned with the small cylindrical portion, a relief valve passage being formed in the cylinder member to be connected to the oil inlet port, the valve element being movable with respect to a valve seat provided in the small cylinder portion, the spring biasing the valve element to the valve seat, the plug being fixedly engaged with an opening end of the large cylindrical portion, supporting an end of the spring and having a drain hole.

8. An installation structure as claimed in claim 7, wherein the relief valve is assembled before inserted into and engaged with the engage hole, the oil inlet port of the small cylindrical portion being fluidly communicated with said hydraulic passage when the relief valve is installed to the engage hole.

9. An integral casing for a toroidal type continuously variable transmission comprising:
   a housing of a torque converter;
   a cover of an oil pump integrally installed to said torque converter housing, said oil pump cover having an oil discharge port from which oil is discharged; and a case of the transmission integrally connected to said torque converter housing and said oil pump cover so that said torque converter housing, said oil pump cover and said transmission case are aligned in sequence, said transmission case comprising an oil supply port through which oil is supplied to a control valve assembly of the transmission, a hydraulic passage connecting the oil discharge port of said oil pump cover and the oil supply port, and a projecting portion which extends toward said torque converter housing and is located in the vicinity of the oil discharge port;

wherein a relief valve for maintaining a pressure of oil discharged from the oil discharge port is disposed in the projecting portion and is connected to the hydraulic passage.

10. An integral casing as claimed in claim 9, wherein the projecting portion is located under a rear portion of said torque converter housing when the integral casing is installed in a vehicle.

* * * * *